United States Patent
Sugiyama et al.

(10) Patent No.: US 12,174,136 B2
(45) Date of Patent: Dec. 24, 2024

(54) GAS DETECTION METHOD AND INFORMATION PROCESSING APPARATUS

(71) Applicant: Sony Group Corporation, Tokyo (JP)

(72) Inventors: Taiki Sugiyama, Tokyo (JP); Nobuyuki Nagai, Tokyo (JP); Michiko Nakao, Tokyo (JP); Kazuhiko Miyahara, Tokyo (JP); Yuichi Ishida, Tokyo (JP); Yoshio Goto, Tokyo (JP)

(73) Assignee: Sony Group Corporation, Tokyo (JP)

(*) Notice: Subject to any disclaimer, the term of this patent is extended or adjusted under 35 U.S.C. 154(b) by 273 days.

(21) Appl. No.: 17/780,769

(22) PCT Filed: Nov. 13, 2020

(86) PCT No.: PCT/JP2020/042380
§ 371 (c)(1),
(2) Date: May 27, 2022

(87) PCT Pub. No.: WO2021/106615
PCT Pub. Date: Jun. 3, 2021

(65) Prior Publication Data
US 2022/0412910 A1    Dec. 29, 2022

(30) Foreign Application Priority Data
Nov. 28, 2019    (JP) .................................. 2019-215377

(51) Int. Cl.
G01N 27/14    (2006.01)
(52) U.S. Cl.
CPC .................................. *G01N 27/14* (2013.01)

(58) Field of Classification Search
None
See application file for complete search history.

(56) References Cited

U.S. PATENT DOCUMENTS

| | | |
|---|---|---|
| 5,427,740 A | 6/1995 | Coles et al. |
| 2017/0363556 A1 | 12/2017 | Nagase et al. |
| 2019/0250134 A1 | 8/2019 | Murata et al. |

FOREIGN PATENT DOCUMENTS

| | | | |
|---|---|---|---|
| JP | 2004271263 A | * | 9/2004 |
| WO | 2018097270 A1 | | 5/2018 |

OTHER PUBLICATIONS

Abstract of JP 2001-175969A, published Jun. 29, 2001, one page.*

(Continued)

*Primary Examiner* — Daniel S Larkin
(74) *Attorney, Agent, or Firm* — K&L Gates LLP (57) ABSTRACT

A gas detection method according to an embodiment of the present technology includes heating a semiconductor sensor that includes an absorption layer that includes a metal oxide; measuring a resistance value of the semiconductor sensor in an air atmosphere in which there exists a reducing gas; and determining that the reducing gas includes a detection-target substance when the measured resistance value is larger than another resistance value in a first temperature range, and when the measured resistance value is smaller than the other resistance value in a second temperature range in which a temperature is higher than a temperature in the first temperature range, the other resistance value being a resistance value of the semiconductor sensor in an air atmosphere in which there exists no reducing gas.

6 Claims, 10 Drawing Sheets

(56) References Cited

OTHER PUBLICATIONS

Abstract of JP 2004-271263A, published Sep. 30, 2004, one page.*
Abstract of JP 2005-134311A, published May 26, 2005, one page.*
Abstract of JP 2008-058214A, published Mar. 13, 2008, one page.*
Abstract of JP 2017-223557A, published Dec. 21, 2017, one page.*
Abstract of JP 2020-056643A, published Apr. 9, 2020, one page.*
Abstract of JPH 1194786A, published Sep. 4, 1999, one page.*
Abstract of JPH 11304746A, published May 11, 1999, one page.*
International Search Report from corresponding PCT application PCT/JP2020/042380, dated Dec. 8, 2020.
Pati, s. et al., n- to p-type carrier reversal in nanocrystalline indium doped ZnO thin film gas sensors, International Journal of Hydrogen Energy, 2014, vol. 39, issue 27, pp. 15134-15141, ISSN 0360-3199, particularly, abstract, p. 15134, left column, I. 4, right column, 11. 12, 13, p. 15136, right column, I. 3 to p. 15138, left column, I. 11, p. 15138, left column, I. 52 to right column, I. 15, p. 15139, right column, I. 13 to p. 15140, left column, I. 2, fig. 5, 6.

* cited by examiner

GAS DETECTION METHOD AND INFORMATION PROCESSING APPARATUS

TECHNICAL FIELD

The present technology relates to a gas detection method and an information processing apparatus.

BACKGROUND ART

A technology is known that uses a metal-oxide (MOx) semiconductor sensor in order to detect and identify gas. For example, Patent Literature 1 discloses a gas sensor that includes an adsorption layer and a sensor layer, the adsorption layer absorbing gas that includes a detection-target gas and a non-detection-target gas, the sensor layer being covered with the adsorption layer, the sensor layer having electric characteristics that vary depending on the concentration of the detection-target gas passing through the adsorption layer. Further, Patent Literature 2 discloses a gas detection apparatus that identifies the type of gas on the basis of an output value of a first gas sensor and an output value of a second gas sensor.

CITATION LIST

Patent Literature

Patent Literature 1: Japanese Patent Application Laid-open No. 2017-223557
Patent Literature 2: Japanese Patent Application Laid-open No. 2001-175969

DISCLOSURE OF INVENTION

Technical Problem

When a reducing gas is blown onto an MOx semiconductor sensor that is being heated, a resistance value of the semiconductor sensor generally starts being changed at a certain temperature. Thus, it is possible to detect the gas or determine the quantity of the gas on the basis of an amount of the change in the resistance value (sensitivity). Further, when there is a large difference in a profile of an amount of a change in resistance (sensitivity) that is caused according to the temperature, this makes it possible to identify the type of gas. However, when there is not a sufficiently large difference in profile, it will be difficult to identify the type of gas.

In view of the circumstances described above, it is an object of the present technology to provide a gas detection method and an information processing apparatus that make it possible to easily identify a specific type of gas.

Solution to Problem

A gas detection method according to an embodiment of the present technology includes heating a semiconductor sensor that includes an absorption layer that includes a metal oxide.

A resistance value of the semiconductor sensor in an air atmosphere in which there exists a reducing gas, is measured.

It is determined that the reducing gas includes a detection-target substance when the measured resistance value is larger than another resistance value in a first temperature range, and when the measured resistance value is smaller than the other resistance value in a second temperature range in which a temperature in the second range is higher than a temperature in the first temperature range, the other resistance value being a resistance value of the semiconductor sensor in an air atmosphere in which there exists no reducing gas.

The air atmosphere in which there exists no reducing gas may be dry air.

The semiconductor sensor may include a plurality of the semiconductor sensors. In this case, heating the semiconductor sensor includes heating the semiconductor sensors of the plurality of the semiconductor sensors to respective heating temperatures that are different from each other, and measuring the resistance value of the semiconductor sensor includes measuring respective resistance values of the semiconductor sensors of the plurality of the semiconductor sensors.

The detection-target substance may be a compound that includes a derivative of benzoic acid.

The derivative of benzoic acid may be hexenyl benzoate or benzyl benzoate.

The metal oxide may be a sintered body that includes a metal-oxide material and a catalyst-metal material.

The metal-oxide material may include one of a tungsten oxide, an indium oxide, and a tin oxide, and the catalyst-metal material may include iridium and an iridium oxide, or a palladium and a palladium oxide.

A gas detection method according to another embodiment of the present technology includes heating a semiconductor sensor that includes an absorption layer that includes a metal oxide.

A resistance value of the semiconductor sensor in an air atmosphere in which there exists a reducing gas, is measured.

It is determined that the reducing gas includes a detection-target substance when sensitivity that corresponds to a ratio of another resistance value to the measured resistance value exhibits a value smaller than one in a first temperature range, and when the sensitivity exhibits a value larger than one in a second temperature range in which a temperature is higher than a temperature in the first temperature range, the other resistance value being a resistance value of the semiconductor sensor in an air atmosphere in which there exists no reducing gas.

An information processing apparatus according to an embodiment of the present technology includes an acquisition section and a determination section.

An acquisition section acquires a resistance value of a metal-oxide semiconductor sensor in an air atmosphere in which there exists a reducing gas.

A determination section determines whether the acquired resistance value is larger than another resistance value in a first temperature range, and whether the acquired resistance value is smaller than the other resistance value in a second temperature range in which a temperature in the second range is higher than a temperature in the first temperature range, the other resistance value being a resistance value of the semiconductor sensor in an air atmosphere in which there exists no reducing gas.

An information processing apparatus according to another embodiment of the present technology includes an acquisition section and a determination section.

An acquisition section acquires a resistance value of a metal-oxide semiconductor sensor in an air atmosphere in which there exists a reducing gas.

A determination section determines whether sensitivity that corresponds to a ratio of another resistance value to the acquired resistance value exhibits a value smaller than one in a first temperature range, and whether the sensitivity exhibits a value larger than one in a second temperature range in which a temperature is higher than a temperature in the first temperature range, the other resistance value being a resistance value of the semiconductor sensor in an air atmosphere in which there exists no reducing gas.

MODE(S) FOR CARRYING OUT THE INVENTION

Figure 1:
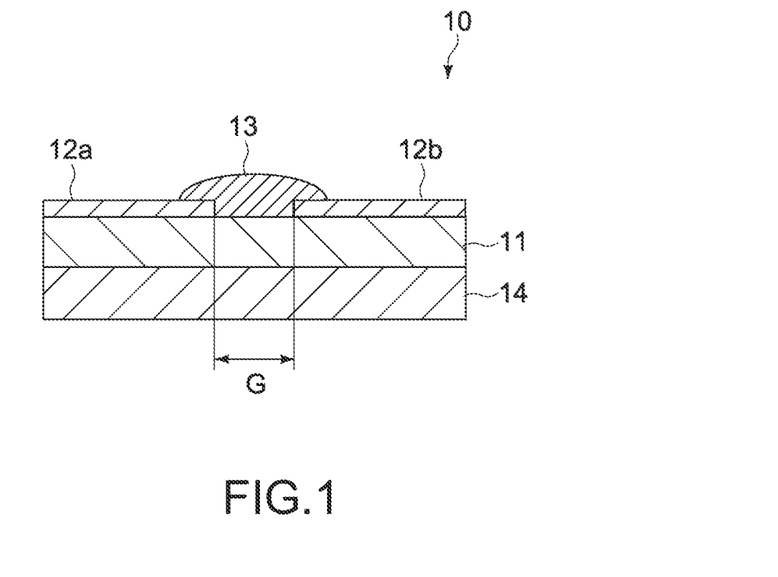
FIG. 1 is a cross-sectional view schematically illustrating a configuration of a primary portion of a semiconductor sensor used in an embodiment of the present technology.

Embodiments according to the present technology will now be described below with reference to the drawings.
[Semiconductor Sensor]
FIG. 1 is a cross-sectional view schematically illustrating a configuration of a primary portion of a semiconductor sensor 10 used in an embodiment of the present technology.

The semiconductor sensor 10 includes a substrate 11, a pair of electrodes 12a and 12b formed on a front surface of the substrate 11, an adsorption layer 13 that is provided between the paired electrodes 12a and 12b, and a heating layer 14 that is arranged on a back surface of the substrate 11.

The substrate 11 is, for example, a quartz substrate.

The paired electrodes 12a and 12b each include a metal layer such as a layer of Ti or Au, or a stack of films thereof, and are formed on the front surface of the substrate 11 to be situated across a gap G from each other.

The adsorption layer 13 includes a metal oxide (MOx) that is a sintered body that includes a metal-oxide material and a catalyst-metal material. Examples of the metal-oxide material include a tungsten oxide, an indium oxide, and a tin oxide. Examples of the catalyst-metal material include iridium, an iridium oxide, a palladium, and a palladium oxide.

The heating layer 14 is used to heat the adsorption layer 13 to a specified temperature, and includes, for example, a ceramic heater. The heating layer 14 is connected to a heater power supply (not illustrated), and can perform heating to, for example, a temperature less than or equal to 400° C. using a control apparatus described later.

In general, when a reducing gas is blown onto an MOx semiconductor sensor that is being heated, a resistance value of the semiconductor sensor generally starts being changed at a certain temperature. Thus, it is possible to detect the gas or determine the quantity of the gas on the basis of an amount of the change in the resistance value (sensitivity). Further, when there is a large difference in a profile of an amount of a change in resistance (sensitivity) that is caused according to the temperature, this makes it possible to identify the type of gas.

Figure 2:
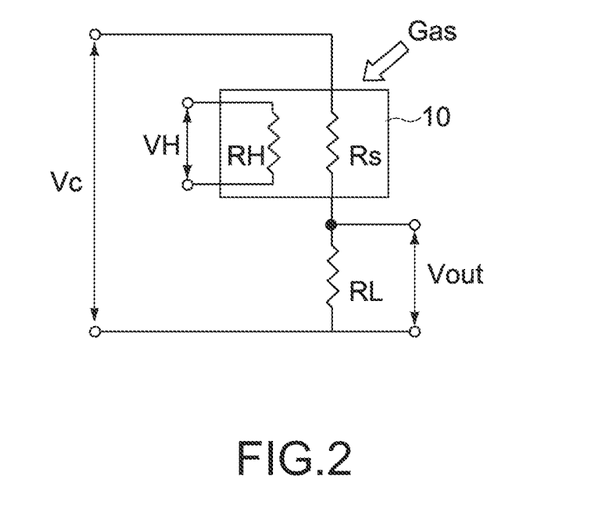
FIG. 2 illustrates a drive circuit of the semiconductor sensor.

FIG. 2 illustrates a drive circuit of the semiconductor sensor 10. In the figure, Rs is a sensor resistance, RL is a load resistance that is connected in series with the sensor resistance Rs, and RH is a heater resistance that causes the semiconductor sensor 10 to be heated, where the heating temperature of the heating layer 14 is adjusted by a heater voltage VH. Further, on the basis of a voltage Vout across the load resistance RL when a power supply voltage Vc is applied across the resistance in series (Rs, RL), the sensor resistance Rs is measured using a formula indicated below.

$$Rs = ((Vc - Vout)/Vout) \times RL$$

Figure 3:
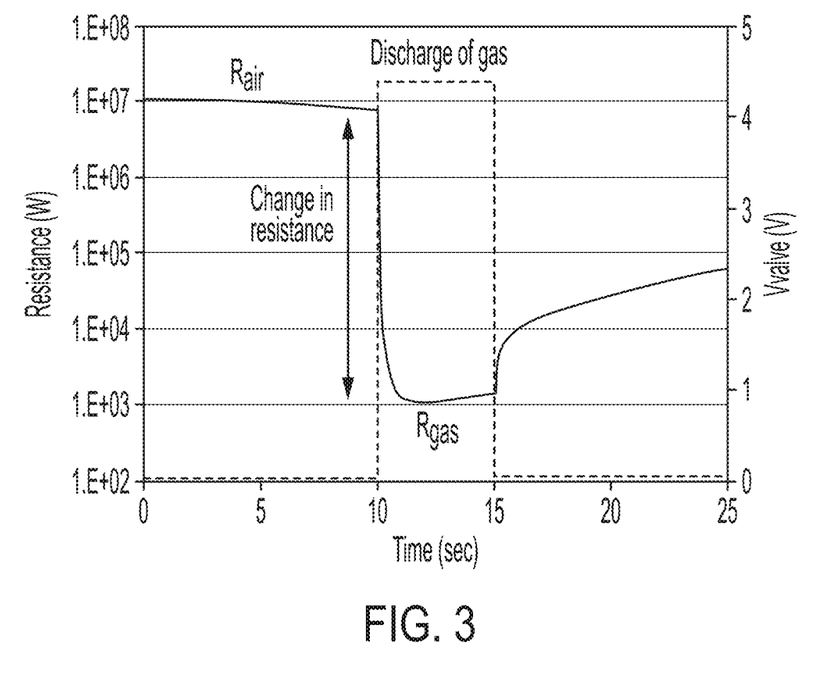
FIG. 3 illustrates an example of a temporal change in a resistance value output from the semiconductor sensor.

FIG. 3 illustrates an example of a temporal change in a resistance value Rs output from the semiconductor sensor 10. In this example, the semiconductor sensor 10 is driven in an air atmosphere in which there exists no reducing gas, and a reducing gas is discharged into the air atmosphere for any period of time (five seconds in this example).

Note that the air atmosphere in which there exists no reducing gas refers to a clean air atmosphere, and typically refers to a dry air atmosphere in which a temperature and humidity are controlled.

As illustrated in FIG. 3, a resistance value Rgas of the semiconductor sensor 10 in an air atmosphere in which there exists a reducing gas is smaller than a resistance value Rair of the semiconductor sensor 10 in a clean air atmosphere. When the discharge of a reducing gas is stopped, output of the semiconductor sensor 10 returns to the resistance value (Rair) in a clean air atmosphere.

The sensitivity to a reducing gas is higher if an amount of reduction in Rgas from Rair is larger. The ratio of Rair to Rgas (Rair/Rgas) is hereinafter defined as sensor sensitivity.

Figure 4:
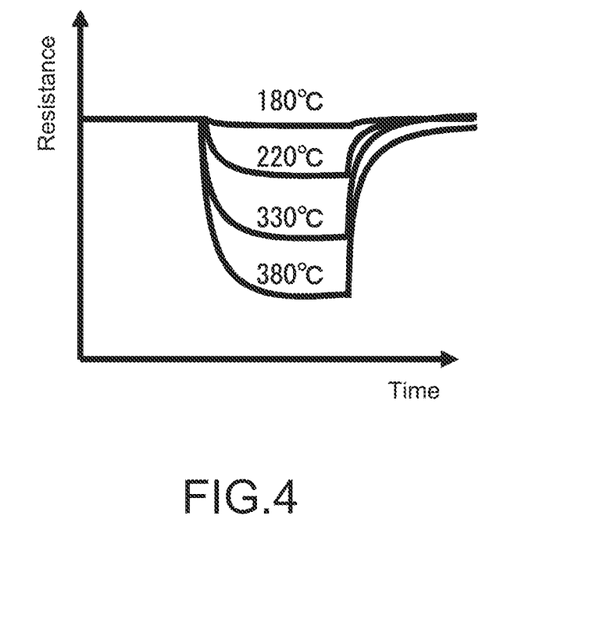
FIG. 4 schematically illustrates a relationship between a heating temperature and a resistance value of the semiconductor sensor.
Figure 5:
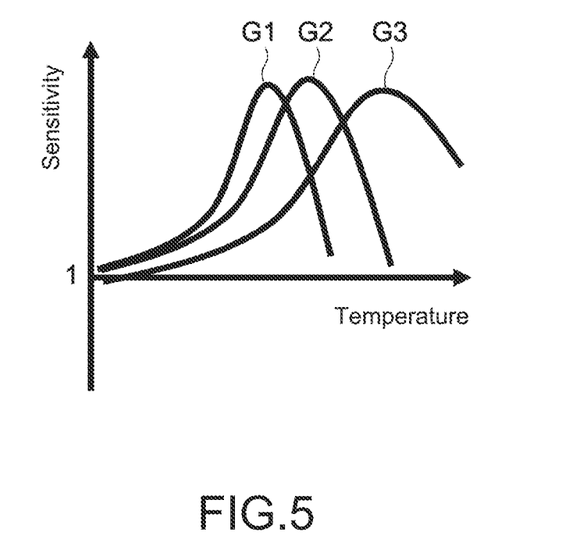
FIG. 5 schematically illustrates a relationship between the heating temperature and sensitivity of the semiconductor sensor.

The resistance value and the sensitivity of the semiconductor sensor 10 are changed according to the heating temperature of the heating layer 14. FIG. 4 schematically illustrates a relationship between a heating temperature and a resistance value (hereinafter also referred to as a resistance-value profile). FIG. 5 schematically illustrates a relationship between the heating temperature and sensitivity (hereinafter also referred to as a sensitivity profile).

In the case of a general reducing gas (such as hydrogen, acetone, ethanol, toluene, benzene, or cyclohexane), the semiconductor sensor 10 tends to exhibit a larger amount of reduction in resistance value and exhibit a sensitivity having a value increased to a value larger than one, as the heating temperature is increased, as illustrated in FIGS. 4 and 5. Further, three different types of gases G1, G2, and G3 can be identified on the basis of a difference in sensitivity profile, as schematically illustrated in FIG. 5.

It is generally considered that a change in a resistance value of the semiconductor sensor 10 due to this type of reducing gas is caused by oxygen being desorbed due to redox of a metal oxide included in the adsorption layer 13.

For example, in an air atmosphere in which there exists no reducing gas, oxygen is adsorbed on a surface of a metal-oxide particle, and a space charge layer is formed near the surface of the particle. This results in forming a potential barrier at a grain boundary and thus in preventing an electron from moving between the particles. Consequently, the resistance value is increased.

When a reducing gas is blown onto the semiconductor sensor 10 in this state, the oxygen adsorbed on the surface of the metal-oxide particle is consumed, and thus the space charge layer is made thinner. This results in the potential barrier being lowered, and thus in the resistance value being reduced.

Since the resistance-value profile and sensitivity profile described above are specific to each type of gas, the type of gas can be identified in principle on the basis of a difference in these profiles. However, when there is not a sufficiently large difference in the profiles, it will be difficult to accurately identify the type of gas.

Figure 6:
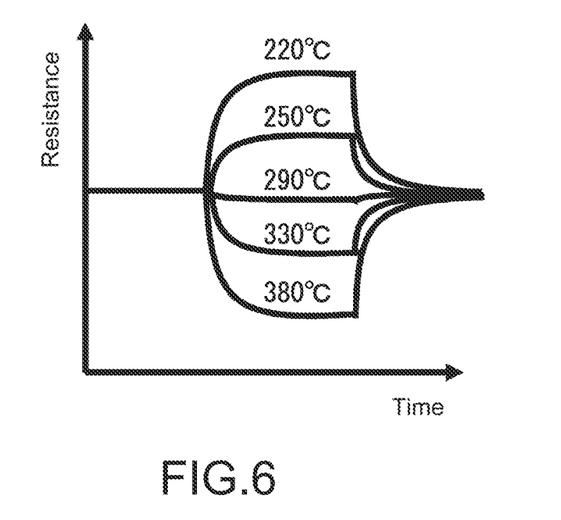
FIG. 6 schematically illustrates a relationship between a heating temperature and a resistance value of the semiconductor sensor in the presence of a specific type of gas.
Figure 7:
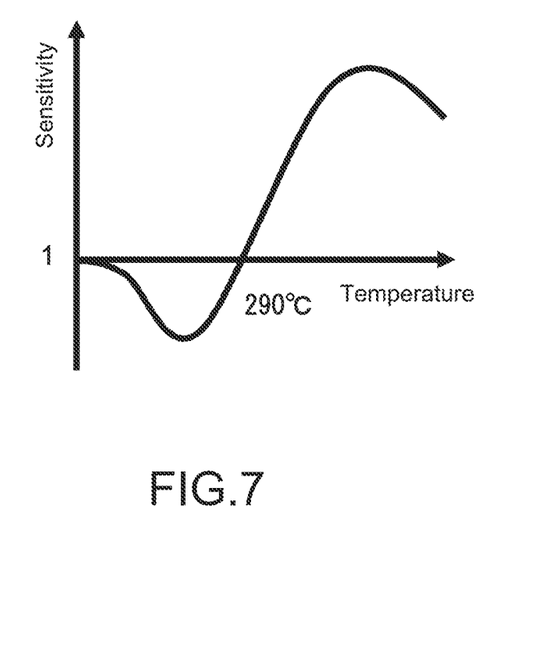
FIG. 7 schematically illustrates a relationship between the heating temperature and sensitivity of the semiconductor sensor in the presence of the specific type of gas.

On the other hand, the inventors have found out that a specific type of reducing gas has a specific resistance-value profile and a specific sensitivity profile, as schematically respectively illustrated in FIGS. 6 and 7.

In other words, the resistance value is increased in a certain temperature range (220° C. to 250° C. in the example of FIG. 6), and is reduced in a temperature range (290° C. to 380° C. in the example of FIG. 6) in which a temperature is higher than a temperature in the certain temperature range described above. When conversion into a sensor sensitivity is performed, the sensitivity exhibits a value smaller than one in the certain temperature range described above, and exhibits a value larger than one in a region of a temperature (greater than or equal to about 290° C.) higher than a temperature in the certain temperature range described above, as illustrated in FIG. 7.

Note that, with respect to the reason that such a specific profile is developed, the details of it are not known. However, the following reason is conceivable. In a low-temperature range, there is an increase in resistance since the specific type of gas is absorbed to attract an electron of the semiconductor sensor, and, in a high-temperature range, there is a reduction in the resistance of the semiconductor sensor since the specific type of gas is decomposed.

Figure 8:
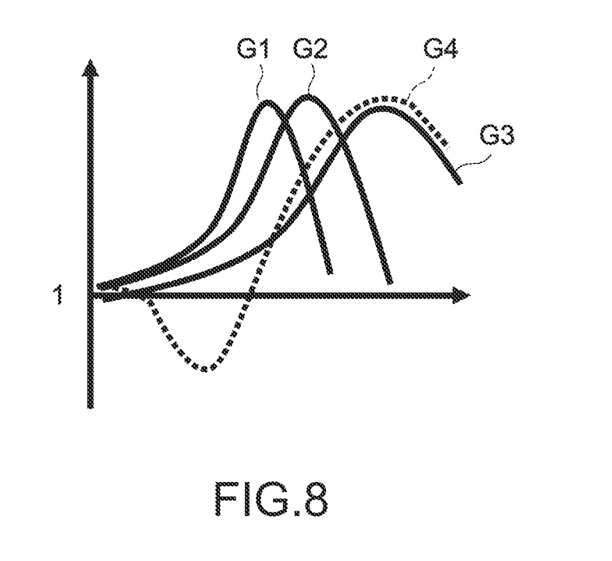
FIG. 8 is a schematic diagram used to describe a method for specifying the type of gas using a difference in sensitivity.

A specific type of gas G4 that corresponds to the type of gas exhibiting the specific profile described above can be easily identified using the property that the sensitivity is first reduced and is then increased, as illustrated in FIG. 8.

Examples of the type of gas exhibiting such a specific sensitivity profile include a compound that includes a derivative of benzoic acid such as hexenyl benzoate or benzyl benzoate (refer to Chemical Formula (1) indicated below).

[Chem. 1]

where R is an alkyl group.

Experimental Examples

Figure 9:
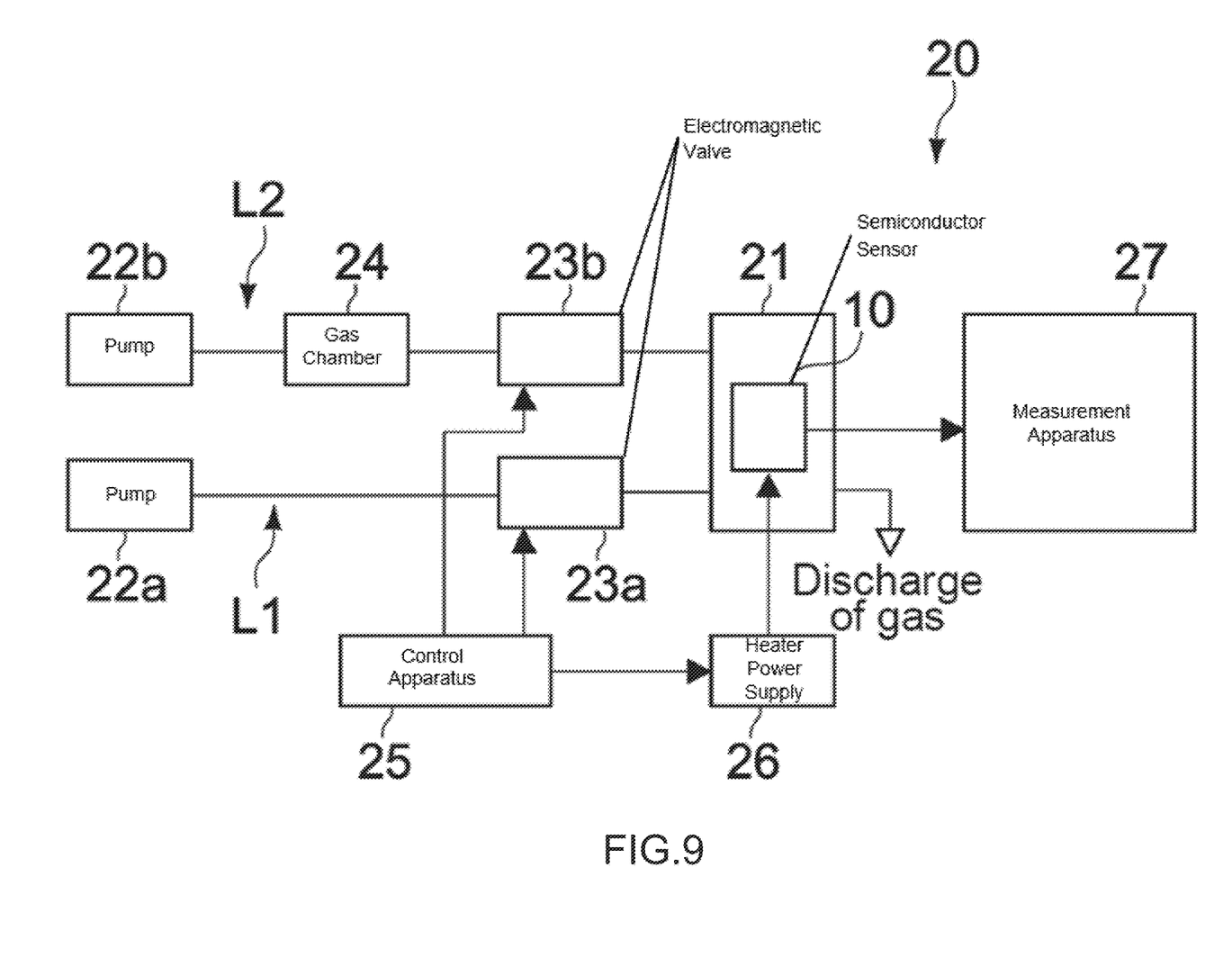
FIG. 9 schematically illustrates a configuration of a gas detection system.

The inventors measured a change in a resistance value output from the semiconductor sensor 10 with respect to various reducing gases, using a gas detection system illustrated in FIG. 9. FIG. 9 schematically illustrates a configuration of a gas detection system 20.

The semiconductor sensor 10 is arranged in a measurement chamber 21. A dry air introducing line L1 and a reducing gas introducing line L2 are connected to the measurement chamber 21. In order to maintain a constant pressure within the measurement chamber 21, gas introduced into the measurement chamber 21 is discharged from the measurement chamber 21.

The dry air introducing line L1 is configured such that dry air (a temperature of 25° C. and relative humidity of 31%, and the same applies to the following description) can be introduced into the measurement chamber 21 through an electromagnetic valve 23a by a pump 22a being driven.

The reducing gas introducing line L2 is configured such that dry air can be introduced into a gas chamber 24 by a pump 22b being driven, the gas chamber 24 being filled with a reducing gas (a saturated vapor), and such that the dry air including the reducing gas at a specified concentration can be introduced into the measurement chamber 21 through an electromagnetic valve 23b.

Each of the electrodes 12a and 12b of the semiconductor sensor 10 was a Ti/Au film that had a shape of a rectangle of 5 mm×4.5 mm and had a thickness of 200 nm. The electrodes 12a and 12b were arranged on the substrate 11 being made of quartz and having a thickness of 525 μm, such that a long side of the electrode 12a and a long side of the electrode 12b were situated across a gap G of 5 μm from each other. A drive voltage Vc input between the electrodes 12a and 12b (refer to FIG. 2) was 5 V. The adsorption layer 13 was an n-type metal-oxide semiconductor ($WO_3$—Pd) including a tungsten oxide that corresponds to a metal-oxide material, and palladium that corresponds to a catalyst-metal material. The adsorption layer 13 had a thickness of from a few micrometers to 30 micrometers.

A commercially available pump providing a flow rate of 400 ml/min was used as the pumps 22a and 22b. Each of the electromagnetic valves 23a and 23b was an open-and-close valve that could switch between two positions that were a fully open position and a fully closed position.

A control apparatus 25 controls the electromagnetic valves 23a and 23b, and a heater power supply 26 that is used to cause the heating layer 14 (refer to FIG. 1) of the semiconductor sensor 10 to perform heating.

The control apparatus 25 opens one of the electromagnetic valves 23a and 23b and closes another of the electromagnetic valves 23a and 23b, in order to select one of the dry air introducing line L1 and the reducing gas introducing line L2.

The control apparatus 25 controls the heating temperature of the semiconductor sensor 10 by controlling the heater power supply 26. The heating temperature of the semiconductor sensor 10 is adjusted discretionarily in a range of from 40° C. to 380° C.

On the basis of an output Vout (refer to FIG. 2) of the semiconductor sensor 10, a measurement apparatus 27 acquires a resistance value Rs of the semiconductor sensor 10 at a plurality of temperatures in the above-described range of the heating temperature. When dry air is introduced into the measurement chamber 21 through the dry air introducing line L1, the resistance value Rs corresponds to a resistance value (Rair) in an air atmosphere in which there exists no reducing gas. When a mixture gas obtained by mixing a reducing gas and dry air is introduced into the measurement chamber 21 through the reducing gas introducing line L2, the resistance value Rs corresponds to a resistance value (Rgas) in an air atmosphere in which there exists a reducing gas.

A response feature of the semiconductor sensor 10 was evaluated with respect to a plurality of types of reducing gases, using the gas detection system 20 having the configuration described above.

Figure 10A:
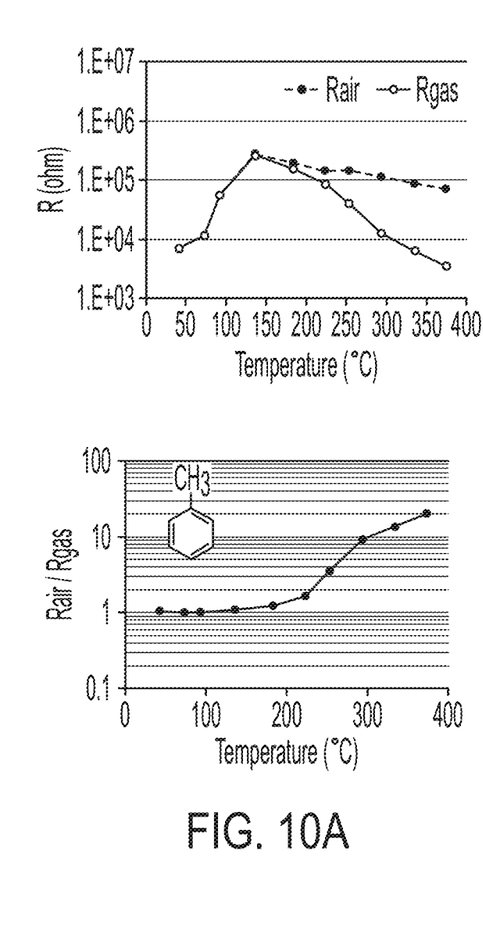
FIG. 10 illustrates an experimental result that shows a resistance value and sensitivity of the semiconductor sensor when each of (A) toluene, (B) benzene, and (C) cyclohexane was used as a reducing gas.
Figure 10B:
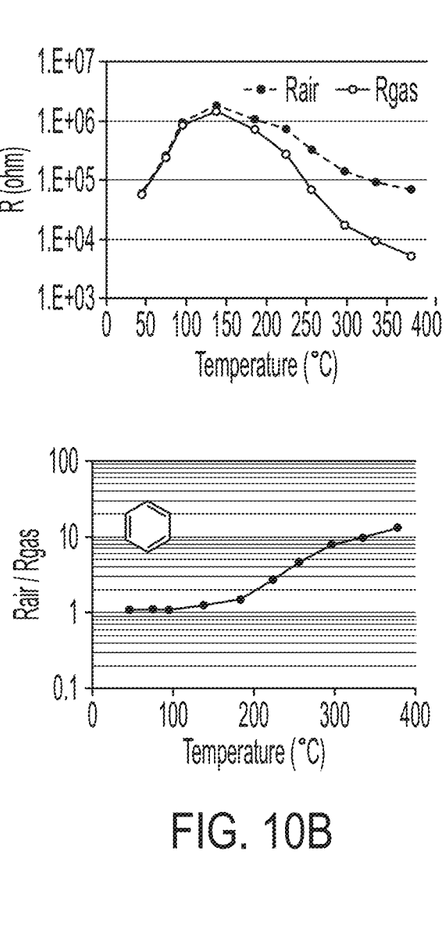
Figure 10C:
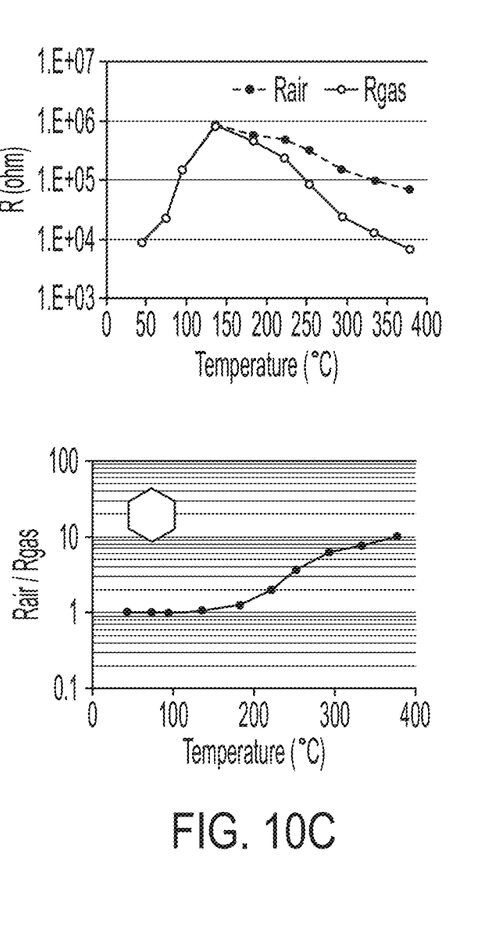

FIG. 10 illustrates a resistance-value profile (in an upper portion) and a sensitivity profile (in a lower portion) for the semiconductor sensor 10 when each of (A) toluene, (B) benzene, and (C) cyclohexane was used as a reducing gas.

As illustrated in the figure, these types of gases each exhibited a change in resistance value at a heating temperature greater than or equal to 100° C., and an amount of reduction in resistance value tended to be gradually increased as the heating temperature was increased. Likewise, the sensor sensitivity tended to be gradually increased as the heating temperature was increased. Sensitivity profiles of these types of gases exhibited aspects consistent with the aspects of the sensitivity profiles of the typical reducing gases illustrated in FIG. 5.

Figure 11A:
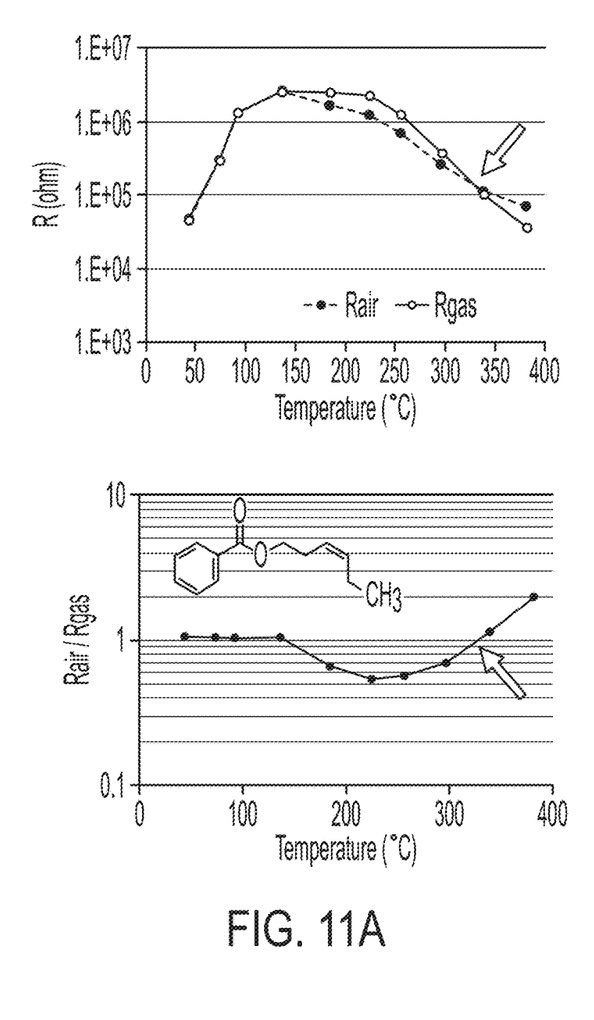
FIG. 11 illustrates an experimental result that shows a resistance value and sensitivity of the semiconductor sensor when each of (A) hexenyl benzoate and (B) benzyl benzoate was used as a reducing gas.
Figure 11B:
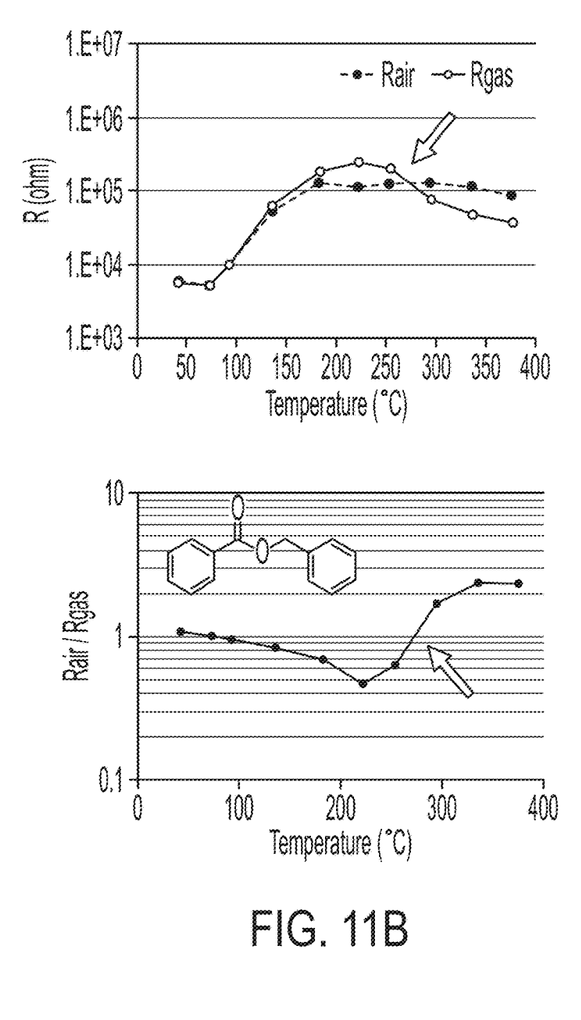

On the other hand, FIG. 11 illustrates a resistance-value profile (in an upper portion) and a sensitivity profile (in a lower portion) for the semiconductor sensor 10 when each of (A) hexenyl benzoate and (B) benzyl benzoate was used as a reducing gas.

With respect to both hexenyl benzoate and benzyl benzoate, in a first temperature range, a measurement value (Rgas) of the semiconductor sensor 10 that was obtained when the specific type of gas was blown onto the semiconductor sensor 10 tended to be larger than a measurement value (Rair) obtained before the blowing of the specific type of gas. On the other hand, in a second temperature range in which a temperature is higher than a temperature in the first temperature range, which of Rgas and Rair is larger was changed (ranges of temperatures higher than temperatures corresponding to points indicated by arrows in the figure), and Rgas was smaller than Rair.

Likewise, the sensor sensitivity exhibited a value smaller than one in the first temperature range, whereas the sensor sensitivity exhibited a value larger than one in the second temperature range (ranges of temperatures higher than temperatures corresponding to points indicated by arrows in the figure), as illustrated in (A) and (B) of FIG. 11.

Note that the first temperature range described above refers to a range of from about 120° C. to about 320° C. in the case of hexenyl benzoate, and refers to a range of from about 120° C. to about 260° C. in the case of benzyl benzoate.

Examples of the type of gas exhibiting the specific resistance-value profile and sensitivity profile illustrated in (A) and (B) of FIG. 11 include derivatives of benzoic acid such as ethyl benzoate, propyl benzoate, and vinyl benzoate in addition to what has been described above.

[Gas Detection Method]

For example, a detection apparatus that includes a dangerous object detecting function described below may be taken as an example of the application of the semiconductor sensor 10.

In order to detect a dangerous object such as a flammable liquid (such as gasoline), a high-pressure gas (such as a gas lighter), or an explosive in, for example, an airport, it is possible to estimate the presence of the dangerous object by detecting a volatile gas generated from the dangerous object.

With respect to the volatile gas generated from a dangerous object, there are various volatile gases such as hydrogen ($H_2$), carbon monoxide (CO), toluene, acetone, formaldehyde, methanol, ethanol, nitrogen dioxide ($NO_2$), sulfur dioxide ($SO_2$), and hydrogen chloride (HCl). On the other hand, such a volatile gas is also generated from an object other than a dangerous object, or such a volatile gas exists in the environment. This may result in difficulty in detecting a dangerous object, or may result in erroneous detection. Thus, a marker substance used for detection may be added to, or mixed with a dangerous object in advance, in order to easily find the dangerous object.

A chemical reaction approach in which a dangerous object is detected using a reagent that chemically reacts with a volatile gas generated from the dangerous object or a marker substance used for detection, is adopted as a general method for detecting a dangerous object. The chemical reaction approach has the advantage of being performed at low costs using a small and lightweight device. On the other hand, there are issues indicated below.

A reagent is not reusable, and thus the approach is not suitable for large-scale screening.

There is a need to provide a reagent for each type of dangerous object, and it takes time to introduce a noble gas into the reagent.

Since a degree of sensitivity is not so high, it is difficult to detect a dangerous object that has a low vapor pressure.

Thus, a dangerous object is immersed in a solvent (a marker substance used for detection) in advance, or the solvent is attached to or carried by the dangerous object in advance, and gas obtained by volatilizing the solvent is detected by a metal-oxide (MOx) semiconductor sensor. This makes it possible to detect a dangerous object or determine the quantity of the dangerous object.

When a reducing gas, such as the derivative of benzoic acid described above, that exhibits a specific sensitivity profile is used as a marker substance used for detection, this makes it possible to easily identify the type of gas, compared to the case in which the general reducing gas (volatile gas) described above is detected.

In order to identify the type of gas, a resistance-value profile for the semiconductor sensor 10 may be referred to, or a sensitivity profile for the semiconductor sensor 10 may be referred to.

When the resistance-value profile is referred to, the semiconductor sensor 10 including an adsorption layer that includes a metal oxide is heated, and a resistance value (Rgas) of the semiconductor sensor 10 in an air atmosphere in which there exists a reducing gas is measured. It is determined that the reducing gas includes a detection-target substance when the measured resistance value (Rgas) is larger than a resistance value (Rair) in a first temperature range, and is smaller than the resistance value (Rair) in a second temperature range in which a temperature is higher than a temperature in the first temperature range, the resistance value (Rair) being a resistance value of the semiconductor sensor 10 in an air atmosphere in which there exists no reducing gas.

On the other hand, when a sensitivity profile is referred to, the semiconductor sensor 10 including an adsorption layer that includes a metal oxide is heated, and a resistance value (Rgas) of the semiconductor sensor 10 in an air atmosphere in which there exists a reducing gas is measured. It is determined that the reducing gas includes a detection-target substance when sensitivity (Rair/Rgas) that corresponds to a ratio of another resistance value to the measured resistance value (Rgas) exhibits a value smaller than one in a first temperature range, and when the sensitivity (Rair/Rgas) exhibits a value larger than one in a second temperature range in which a temperature is higher than a temperature in the first temperature range, the other resistance value being a resistance value of the semiconductor sensor 10 in an air atmosphere in which there exists no reducing gas.

(Information Processing Apparatus)

In the gas detection system described above, the measurement apparatus 27 may be configured as an apparatus for detecting a reducing gas that includes a derivative of benzoic acid.

Figure 12:
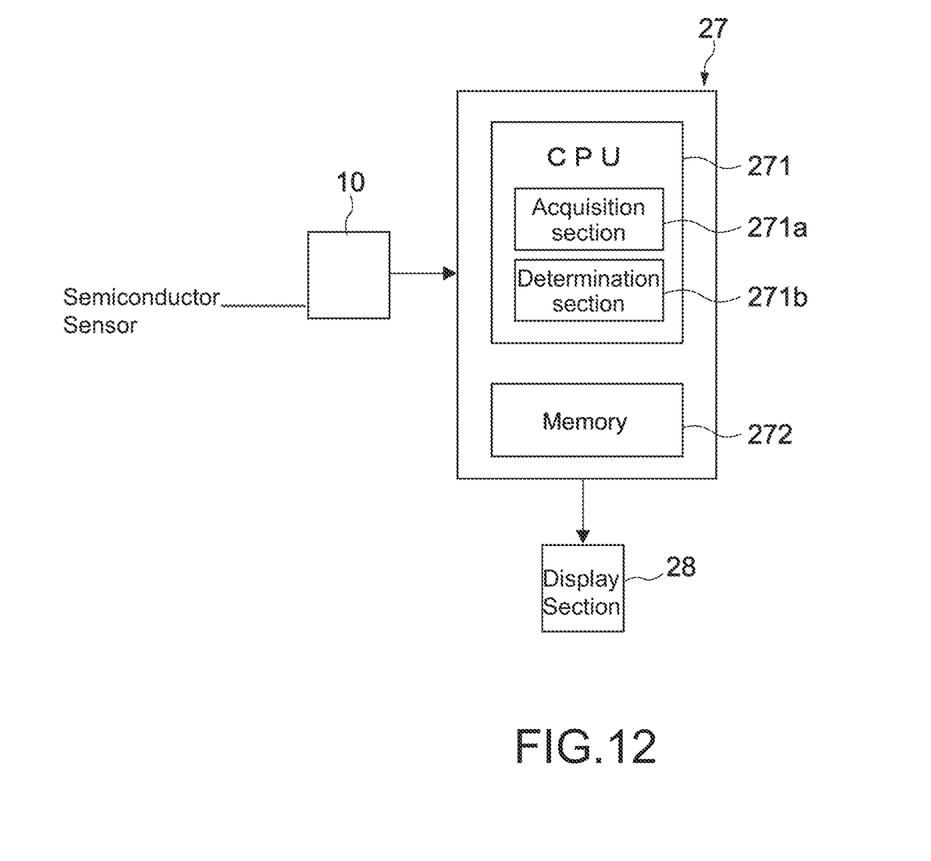
FIG. 12 schematically illustrates a configuration of a gas detection apparatus.

FIG. 12 schematically illustrates a configuration of the measurement apparatus 27. The measurement apparatus 27 is a computer (an information processing apparatus) that includes a CPU 271 and a memory 272.

The CPU 271 includes an acquisition section 271a and a determination section 271b. The acquisition section 271a acquires a resistance value Rgas of the semiconductor sensor 10 in an air atmosphere in which there exists a reducing gas.

The acquisition section 271a may include a computation section that converts output (Vout) of the semiconductor sensor 10 into the resistance value Rgas.

The determination section 271a is configured to determine whether a resistance-value profile or a sensitivity profile for the semiconductor sensor 10 is a specified profile on the basis of the resistance value Rgas of the semiconductor sensor 10 that is acquired by the acquisition section 271a.

The memory 272 is an information storage apparatus such as a semiconductor memory or a hard disk. The memory 272 stores therein a program used to operate the acquisition section 271a and the determination section 271b as functional blocks of the CPU 271. Further, the memory 272 stores therein pieces of data that are respectively related to a resistance-value profile and a sensitivity profile for the semiconductor sensor 10 in an air atmosphere in which there exists no reducing gas.

Output of the measurement apparatus 27 may be displayed on a display section 28. The display section 28 displays thereon, for example, the resistance-value profile and the sensitivity profile for the semiconductor sensor 10 as illustrated in FIG. 10 or 11.

(Processing Procedure 1)

Figure 13:
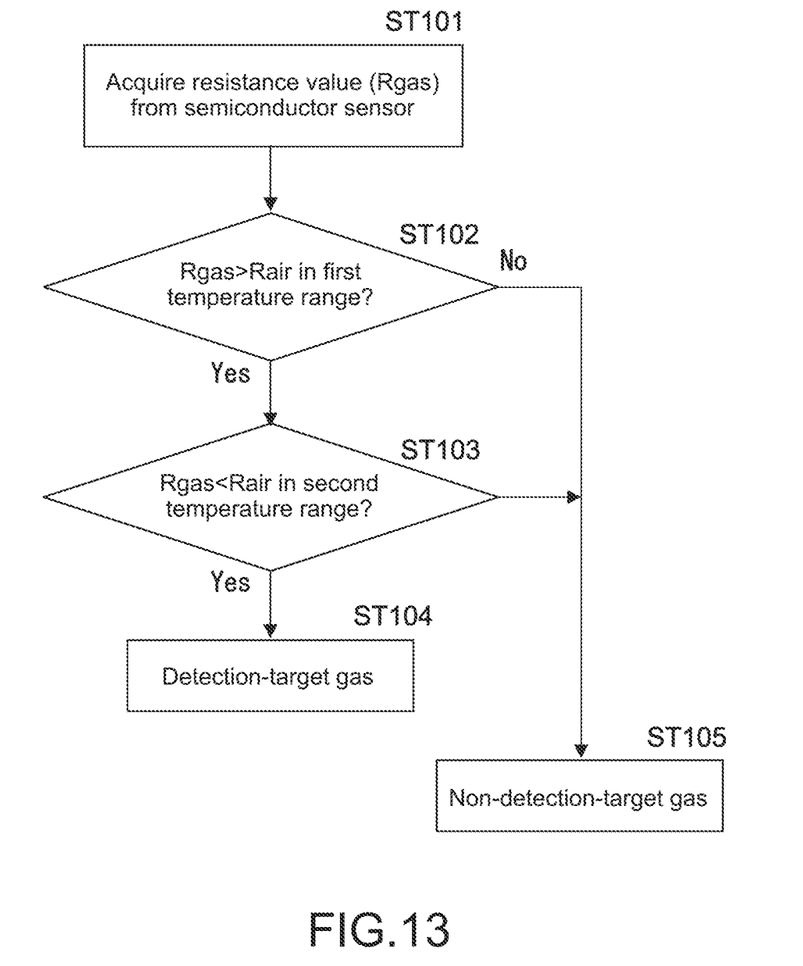
FIG. 13 is a flowchart illustrating an example of a procedure of processing performed by the gas detection apparatus.

FIG. 13 is a flowchart illustrating an example of a procedure of processing performed by the CPU 271.

First, the acquisition section 271a acquires a resistance value (Rgas) of the semiconductor sensor 10 in an air atmosphere in which there exists a reducing gas (Step 101).

Subsequently, the determination section 271b determines whether the measured resistance value (Rgas) is larger than a resistance value (Rair) in a first temperature range, the resistance value (Rair) being a resistance value of the semiconductor sensor in an air atmosphere in which there exists no reducing gas (Step 102).

When Rgas>Rair ("Yes" in Step 102), the determination section 271b further determines whether the measured resistance value (Rgas) is smaller than the resistance value (Rair) in a second temperature range in which a temperature is higher than a temperature in the first temperature range, the resistance value (Rair) being a resistance value of the semiconductor sensor in an air atmosphere in which there exists no reducing gas (Step 103).

When it has been determined to be "Yes" in Steps 102 and 103, the determination section 271b determines that the reducing gas is a detection-target gas (a gas that includes a derivative of benzoic acid) (Step 104). When it has been determined to be "No" in at least one of Steps 102 and 103, the determination section 271b determines that the reducing gas is a non-detection-target gas (a gas that does not include a derivative of benzoic acid) (Step 105).

(Processing Procedure 2)

Figure 14:
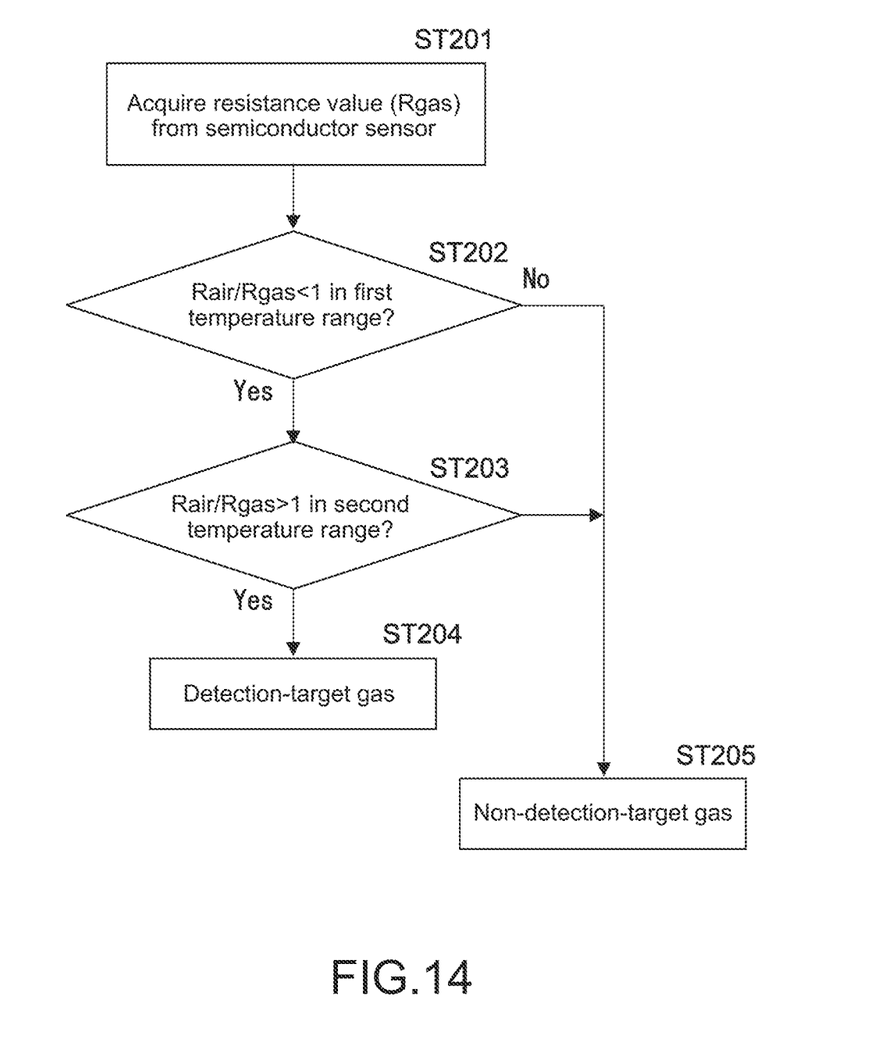
FIG. 14 is a flowchart illustrating another example of the procedure of the processing performed by the gas detection apparatus.

FIG. 14 is a flowchart illustrating another example of the procedure of the processing performed by the CPU 271.

First, the acquisition section 271a acquires a resistance value (Rgas) of the semiconductor sensor 10 in an air atmosphere in which there exists a reducing gas (Step 201).

Subsequently, the determination section 271b determines whether sensitivity (Rair/Rgas) that corresponds to a ratio of a resistance value (Rair) to the measured resistance value (Rgas) exhibits a value smaller than one in a first temperature range, the resistance value (Rair) being a resistance value of the semiconductor sensor in an air atmosphere in which there exists no reducing gas (Step 202).

When Rair/Rgas<1 ("Yes" in Step 202), the determination section 271b further determines whether the sensitivity exhibits a value larger than one in a second temperature range in which a temperature is higher than a temperature in the first temperature range (Step 203).

When it has been determined to be "Yes" in Steps 202 and 203, the determination section 271b determines that the reducing gas is a detection-target gas (a gas that includes a derivative of benzoic acid) (Step 204). When it has been determined to be "No" in at least one of Steps 202 and 203, the determination section 271b determines that the reducing gas is a non-detection-target gas (a gas that does not include a derivative of benzoic acid) (Step 205).

The first and second temperature ranges described above may be set in advance, or it may be determined whether there are regions that correspond to the first and second temperature ranges after all of the measurement values at respective temperatures are acquired.

Further, the resistance value of the semiconductor sensor 10 at each heating temperature may be a resistance value measured in a specified sampling period while increasing the heating temperature of the semiconductor sensor 10 at a specified heating rate.

Alternatively, measurement values when a plurality of semiconductor sensors 10 is used and when the semiconductor sensors of the plurality of semiconductor sensors are respectively heated to different heating temperatures, may be used.

Other Applications

The gas detection method described above can also be applied to the case in which gasoline or city gas is stored, in order to detect the leakage of a flammable liquid or the gasification of the flammable liquid (the leakage of gas).

In this case, a substance that includes a derivative of benzoic acid is added to gasoline or city gas in advance as a marker substance used for detection, and a gas sensor of a metal-oxide (MOx) semiconductor is installed near a storage place for a flammable liquid, in order to detect the leakage or the gasification of the flammable liquid. Also in the case of such an application, the leakage of liquid or gas can be detected with a high degree of sensitivity using a specific resistance-value profile or a specific sensitivity profile of the marker substance.

Note that the present technology may also take the following configurations.

(1) A gas detection method, including:
heating a semiconductor sensor that includes an absorption layer that includes a metal oxide;
measuring a resistance value of the semiconductor sensor in an air atmosphere in which there exists a reducing gas; and determining that the reducing gas includes a detection-target substance when the measured resistance value is larger than another resistance value in a first temperature range, and when the measured resistance value is smaller than the other resistance value in a second temperature range in which a temperature is higher than a temperature in the first temperature range, the other resistance value being a resistance value of the semiconductor sensor in an air atmosphere in which there exists no reducing gas.

(2) The gas detection method according to (1), in which the air atmosphere in which there exists no reducing gas is dry air.

(3) The gas detection method according to (1) or (2), in which
the semiconductor sensor includes a plurality of the semiconductor sensors,
the heating the semiconductor sensor includes heating the semiconductor sensors of the plurality of the semiconductor sensors to respective heating temperatures that are different from each other, and the measuring the resistance value of the semiconductor sensor includes measuring respective resistance values of the semiconductor sensors of the plurality of the semiconductor sensors.

(4) The gas detection method according to any one of (1) to (3), in which
the detection-target substance is a compound that includes a derivative of benzoic acid.

(5) The gas detection method according to (4), in which
the derivative of benzoic acid is hexenyl benzoate or benzyl benzoate.

(6) The gas detection method according to any one of (1) to (5), in which
the metal oxide is a sintered body that includes a metal-oxide material and a catalyst-metal material.

(7) The gas detection method according to (6), in which
the metal-oxide material includes one of a tungsten oxide, an indium oxide, and a tin oxide, and
the catalyst-metal material includes iridium and an iridium oxide, or a palladium and a palladium oxide.

(8) A gas detection method, including:
heating a semiconductor sensor that includes an absorption layer that includes a metal oxide;
measuring a resistance value of the semiconductor sensor in an air atmosphere in which there exists a reducing gas; and
determining that the reducing gas includes a detection-target substance when sensitivity that corresponds to a ratio of another resistance value to the measured resistance value exhibits a value smaller than one in a first temperature range, and when the sensitivity exhibits a value larger than one in a second temperature range in which a temperature is higher than a temperature in the first temperature range, the other resistance value being a resistance value of the semiconductor sensor in an air atmosphere in which there exists no reducing gas.

(9) An information processing apparatus, including:
an acquisition section that acquires a resistance value of a metal-oxide semiconductor sensor in an air atmosphere in which there exists a reducing gas; and
a determination section that determines whether the acquired resistance value is larger than another resistance value in a first temperature range, and whether the acquired resistance value is smaller than the other resistance value in a second temperature range in which a temperature is higher than a temperature in the first temperature range, the other resistance value being a resistance value of the semiconductor sensor in an air atmosphere in which there exists no reducing gas.

(10) An information processing apparatus, including:
an acquisition section that acquires a resistance value of a metal-oxide semiconductor sensor in an air atmosphere in which there exists a reducing gas; and
a determination section that determines whether sensitivity that corresponds to a ratio of another resistance value to the acquired resistance value exhibits a value smaller than one in a first temperature range, and whether the sensitivity exhibits a value larger than one in a second temperature range in which a temperature is higher than a temperature in the first temperature range, the other resistance value being a resistance value of the semiconductor sensor in an air atmosphere in which there exists no reducing gas.

REFERENCE SIGNS LIST 10 semiconductor sensor
11 substrate
12a, 12b electrode
13 absorption layer
14 heating layer
20 gas detection system
27 measurement apparatus
271a acquisition section
271b determination section

The invention claimed is:

1. A gas detection method, comprising:
heating a semiconductor sensor that includes an absorption layer that includes a metal oxide;
measuring a resistance value of the semiconductor sensor in an air atmosphere in which there exists a reducing gas; and
determining that the reducing gas includes a detection-target substance when the measured resistance value is larger than another resistance value in a first temperature range, and when the measured resistance value is smaller than the other resistance value in a second temperature range in which a temperature is higher than a temperature in the first temperature range, the other resistance value being a resistance value of the semiconductor sensor in an air atmosphere in which there exists no reducing gas;
wherein the detection-target substance is a compound that includes a derivative of benzoic acid; and
wherein the derivative of benzoic acid is hexenyl benzoate or benzyl benzoate.

2. The gas detection method according to claim 1, wherein the air atmosphere in which there exists no reducing gas is dry air.

3. The gas detection method according to claim 1, wherein
the semiconductor sensor includes a plurality of the semiconductor sensors,
the heating the semiconductor sensor includes heating the semiconductor sensors of the plurality of the semiconductor sensors to respective heating temperatures that are different from each other, and
the measuring the resistance value of the semiconductor sensor includes measuring respective resistance values of the semiconductor sensors of the plurality of the semiconductor sensors.

4. The gas detection method according to claim 1, wherein
the metal oxide is a sintered body that includes a metal-oxide material and a catalyst-metal material.

5. The gas detection method according to claim 4, wherein
the metal-oxide material includes one of a tungsten oxide, an indium oxide, and a tin oxide, and
the catalyst-metal material includes iridium and an iridium oxide, or a palladium and a palladium oxide.

6. A gas detection method, comprising:
heating a semiconductor sensor that includes an absorption layer that includes a metal oxide;
measuring a resistance value of the semiconductor sensor in an air atmosphere in which there exists a reducing gas; and
determining that the reducing gas includes a detection-target substance when sensitivity that corresponds to a ratio of another resistance value to the measured resistance value exhibits a value smaller than one in a first temperature range, and when the sensitivity exhibits a value larger than one in a second temperature range in which a temperature is higher than a temperature in the first temperature range, the other resistance value being a resistance value of the semiconductor sensor in an air atmosphere in which there exists no reducing gas;
wherein the detection-target substance is a compound that includes a derivative of benzoic acid; and
wherein the derivative of benzoic acid is hexenyl benzoate or benzyl benzoate.

* * * * *